US012491312B2

(12) United States Patent
Burns (10) Patent No.: US 12,491,312 B2
(45) Date of Patent: Dec. 9, 2025

(54) DRUG DELIVERY AND BIOMARKER ACCESS DEVICES

(71) Applicant: Mayo Foundation for Medical Education and Research, Rochester, MN (US)

(72) Inventor: Terence C. Burns, Rochester, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 978 days.

(21) Appl. No.: 17/289,092

(22) PCT Filed: Nov. 26, 2019

(86) PCT No.: PCT/US2019/063271
§ 371 (c)(1),
(2) Date: Apr. 27, 2021

(87) PCT Pub. No.: WO2020/112788
PCT Pub. Date: Jun. 4, 2020

(65) Prior Publication Data
US 2021/0378641 A1     Dec. 9, 2021

Related U.S. Application Data

(60) Provisional application No. 62/771,985, filed on Nov. 27, 2018.

(51) Int. Cl.
*A61M 5/142*     (2006.01)
*A61M 5/152*     (2006.01)
*A61M 39/02*     (2006.01)

(52) U.S. Cl.
CPC ........ *A61M 5/14276* (2013.01); *A61M 5/152* (2013.01); *A61M 39/0208* (2013.01); *A61M 2210/0693* (2013.01)

(58) Field of Classification Search
CPC ........ A61M 2039/025; A61M 39/0247; A61M 2039/0276; A61M 2039/0264;
(Continued)

(56) References Cited

U.S. PATENT DOCUMENTS 4,816,016 A *  3/1989  Schulte ............... A61M 5/1428
                                                    604/9
5,640,954 A     6/1997  Pfeiffer et al.
(Continued)

FOREIGN PATENT DOCUMENTS

CN         102525569         7/2012

OTHER PUBLICATIONS

Birngruber et al., "Cerebral open flow microperfusion: a new in vivo technique for continuous measurement of substance transport across the intact blood-brain barrier," Clin. Exp. Pharmacol. Physiology, Dec. 2013, 40(12):864-871.
(Continued)

*Primary Examiner* — Kami A Bosworth
*Assistant Examiner* — Avery Smale
(74) *Attorney, Agent, or Firm* — Fish & Richardson P.C.

(57) ABSTRACT

This document describes devices for in vivo drug testing in the brain. This document also describes implantable devices for long-term drug delivery to the brain parenchyma, and for access to biomarkers from the parenchyma.

9 Claims, 3 Drawing Sheets

(58) Field of Classification Search
CPC ............ A61M 5/14276; A61M 5/1428; A61M 5/148; A61M 5/152; A61M 2210/0693; A61M 5/1424; A61M 2039/0202; A61M 2039/0205; A61M 39/0208; A61M 2039/0211; A61B 5/14528; A61B 10/0045; A61B 2010/0077
See application file for complete search history.

(56) References Cited

U.S. PATENT DOCUMENTS

| | | | | |
|---|---|---|---|---|
| 6,945,955 | B1* | 9/2005 | Michel | A61B 5/1473 604/93.01 |
| 8,152,792 | B1* | 4/2012 | Kornel | A61M 39/0208 604/21 |
| 2005/0131388 | A1* | 6/2005 | Cheng | A61M 5/1428 604/891.1 |
| 2006/0253106 | A1* | 11/2006 | Nelson | A61M 5/148 604/891.1 |
| 2009/0171290 | A1* | 7/2009 | Li | A61M 39/0208 604/174 |
| 2011/0009814 | A1 | 1/2011 | Tsoukalis | |
| 2011/0033463 | A1 | 2/2011 | Thakker et al. | |
| 2012/0053571 | A1 | 3/2012 | Petri | |
| 2013/0085441 | A1* | 4/2013 | Aihara | A61M 5/14276 604/9 |
| 2018/0136247 | A1 | 5/2018 | Boutelle et al. | |
| 2018/0193617 | A1* | 7/2018 | Chappel | A61M 5/1428 |
| 2018/0207357 | A1 | 7/2018 | John | |

OTHER PUBLICATIONS

Blakeley et al., "Microdialysis for assessing intratumoral drug disposition in brain cancers: a tool for rational drug development," Expert Opin. Drug Metab. Toxicology, Dec. 2010, 6(12):1477-1491.

Engström et al., "Intracerebral microdialysis in severe brain trauma: the importance of catheter location," J. Neurosurgery, Mar. 2005, 102(3):460-469.

Höcht et al., "Applicability of reverse microdialysis in pharmacological and toxicological studies," J. Pharmacol. Toxicol. Methods, Jan./Feb. 2007, 55(1):3-15.

PCT International Preliminary Report on Patentability in International Appln. No. PCT/US2019/063271, dated May 25, 2021, 7 pages.

PCT International Search Report and Written Opinion in International Appln. No. PCT/US2019/063271, dated Feb. 7, 2020, 9 pages.

Ronquist et al., "Treatment of malignant glioma by a new therapeutic principle," Acta Neurochirurgica, Mar. 1992, 114(1-2):8-11.

Wibom et al., "Metabolomic patterns in glioblastoma and changes during radiotherapy: a clinical microdialysis study," J. Proteome Research, Jun. 4, 2010, 9(6):2909-2919.

EP Extended Search Report in European Appln. No. 19889753.0, dated Feb. 3, 2022, 5 pages.

* cited by examiner

DRUG DELIVERY AND BIOMARKER ACCESS DEVICES

CROSS-REFERENCE TO RELATED APPLICATIONS

This application is a National Stage application under 35 U.S.C. § 371 of International Application No. PCT/US2019/063271 having an International Filing Date of Nov. 26, 2019, which claims priority to U.S. Application Ser. No. 62/771,985, filed on Nov. 27, 2018. The disclosure of the prior applications are considered part of the disclosure of this application, and are incorporated in their entirety into this application.

BACKGROUND

1. Technical Field

This document relates to devices for in vivo drug testing in the brain. This document also relates to implantable devices for long-term drug delivery to the brain parenchyma, and for access to biomarkers from the parenchyma.

2. Background Information

Translation of therapies for human Central Nervous System (CNS) diseases such as glioma, traumatic brain injury, stroke, and Alzheimer's disease has been disappointing. Challenges have included the relative inaccessibility of the human brain, the blood brain barrier, and the challenge of developing animal models to faithfully recapitulate human disease. Moreover, the paucity of biomarkers of therapeutic efficacy, patient heterogeneity, and the lack of clinical trial mechanisms to efficiently screen needed multi-drug therapies, have all hampered progress.

Gliomas remain incurable. The most common adult glioma is glioblastoma (GBM), which is typically fatal in one year. Lower grade gliomas disproportionately impact young patients, and unfortunately also ultimately transform into fatal high grade tumors. These low-grade tumors have even fewer preclinical research tools available, as the patient-derived tumors from lower grade tumors do not grow in animal xenograft models. Clinical trials are hampered by a prolonged latency between initial diagnosis and therapy, and fulminant diseases progression. Surgery prolongs survival by reducing disease burden, but cannot remove malignant cells that have already infiltrated widely throughout the brain prior to diagnosis. As such, surgery is not a cure. Chemotherapy and radiation slow tumor progression, but recurrence is inevitable, and impacts quality of life due to central nervous system (CNS) toxicities.

In some cases, the above hurdles may be confronted using an implantable approach to directly access the extracellular fluid space of diseased human brain tissue. Harnessing neurosurgical access to the human brain may help overcome several of the long-standing challenges hampering identification and translation of effective therapies for human neurological diseases.

SUMMARY

This document describes devices for in vivo drug testing in the brain. This document also describes implantable devices for long-term drug delivery to the brain parenchyma, and for access to biomarkers from the parenchyma.

In a first aspect, this disclosure is directed to an implantable drug delivery and biomarker access device. The implantable drug delivery and biomarker access device includes: (i) a first reservoir configured to be implanted between a scalp and skull of a patient, the first reservoir being naturally biased to be in an expanded configuration; (ii) a second reservoir configured to be implanted between the scalp and the skull of the patient, the first reservoir being naturally biased to be in an unexpanded configuration; (iii) a first one-way valve disposed along a fluid connection between the first and second reservoirs, the first one-way valve oriented to allow fluid to flow from the first reservoir to the second reservoir and to prevent fluid from flowing from the second reservoir to the first reservoir; (iv) a perfusion catheter extending from the second reservoir and in fluid communication therewith; (v) a return catheter extending from the first reservoir and in fluid communication therewith; and (iv) a second one-way valve disposed along the return catheter, the second one-way valve oriented to allow fluid to flow from the return catheter to the first reservoir and to prevent fluid from flowing from the first reservoir to the return catheter.

Such an implantable drug delivery and biomarker access device may optionally include one or more of the following features. The implantable device may also include a first flow control valve disposed along the perfusion catheter and configured to throttle or modulate fluid flow through the perfusion catheter. The implantable device may also include a second flow control valve disposed along the return catheter and configured to throttle or modulate fluid flow through the return catheter. In some embodiments, at least a portion of the perfusion catheter and at least a portion of the return catheter are joined together as a dual lumen catheter. At least a portion of the dual lumen may comprise the perfusion catheter located coaxially within the return catheter. The dual lumen catheter may includes wall fenestration into the return catheter.

In another aspect, this disclosure is directed to a method of delivering a drug into a brain parenchyma of a patient and accessing biomarkers from the brain parenchyma. The method can include implanting any of the embodiments of the implantable drug delivery and biomarker access devices described herein such that the first and second reservoirs are positioned between the scalp and the skull of the patient, and such that the perfusion and return catheters extend into the brain parenchyma. The method can also include compressing the first reservoir such that a fluid in the first reservoir is caused to flow into the second reservoir. The method can also include allowing the fluid to flow out of the second reservoir and into the perfusion catheter as a result of the natural bias of the second reservoir to be in the unexpanded configuration. At least some of the fluid that flows into the perfusion catheter exits from the perfusion catheter into the brain parenchyma. The method can also include, after compressing the first reservoir, allowing the first reservoir to re-expand as a result of the natural bias of the first reservoir to be in the expanded configuration. At least some of the fluid from the brain parenchyma is drawn into the return catheter and flows from the return catheter into the first reservoir as a result of the re-expansion of the first reservoir.

Such a method may optionally include one or more of the following features. The method may also include, after the at least some of the fluid from the brain parenchyma has flowed into the first reservoir, aspirating the fluid from the first reservoir. In some embodiments, the aspirating is performed using a syringe through the scalp.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described herein. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the accompanying drawings and the description herein. Other features, objects, and advantages of the invention will be apparent from the description and drawings, and from the claims.

DESCRIPTION OF THE DRAWINGS

Like reference numbers represent corresponding parts throughout.

DETAILED DESCRIPTION

This document describes devices for in vivo drug testing in the brain. This document also describes implantable devices for long-term drug delivery to the brain parenchyma, and for access to biomarkers from the parenchyma. For example, the devices and systems described herein can be deployed for use in patients with glioma (incurable tumors for which the standard of care already requires neurosurgical intervention to obtain diagnostic tissue and perform maximal safe tumor removal). Since gliomas widely infiltrate normal brain tissue, surgery is generally not curative but can provide critical access to diseased human central nervous system (CNS) tissue.

Commercial development of neurotherapeutics is slow. Current drug development strategies require hundreds of patients to enroll for testing of a single drug over many years at great expense. Outcomes may be obscured by subject heterogeneity and relatively crude neurological or imaging-based outcomes scales. Insights are limited by the current lack of biomarkers of therapeutic efficacy. Typically, little or no molecular feedback is obtained to understand why a candidate treatment failed in any given patient. The blood brain barrier presents additional challenges for drug delivery and biomarker recovery. Multiple therapeutic targets may need to be impacted simultaneously to combat a complex disease, but is not congruent with the current practice of evaluating a single novel therapy per clinical trial.

Malignant glioma cells thrive through complex interactions with their microenvironment that are incompletely understood. These cannot yet be accurately replicated outside the human brain. Current preclinical models include human gliomas grown within immune deficient animals, and mice genetically engineered to develop gliomas—neither of which replicate the unique metabolism of human tumor microenvironment, nor the nuanced regulation of the human immune system. Although novel immunotherapies may be promising for some patients, it is not yet possible to predict who may respond, nor detect in real time whether or not therapies are effective. Immune therapies are prone to "pseudoprogression" on MRI that can be indistinguishable from true tumor progression.

The implantable device strategies described herein are intended to yield real-time biological feedback regarding the impact of one or multiple drugs on each patient's tumor, providing scientific and clinical access to the best available model of any given patient's brain tumor—their own brain tumor itself. The devices and systems described herein are likely to be employed by academic medical centers in collaboration with industry to vastly accelerate the rate of discovery. Moreover, the devices and systems described herein are able to yield biological efficacy and toxicity data regarding multiple drugs or drug combinations in a single patient.

Recent work has demonstrated that alterations within metabolic pathways, epitomized by IDH mutant gliomas, can themselves induce tumorigenesis. This presents an opportunity for therapeutic intervention and to identify metabolic biomarkers of disease (such as 2-HG) and therapeutic efficacy.

Gliomas undergo an epithelial-to-mesenchmal-like transition that portends worsened prognosis and is associated with a unique metabolomic phenotype. The hypoxic tumor core promotes upregulation of stem cell-like properties, and stress responses that facilitate resilience and resistance to therapy. Inflammatory cells recruited to the tumor are influenced by the tumor to secrete factors advantageous to tumor growth Adaptive dependence of tumor cells upon these numerous alterations provides opportunities for therapeutic manipulation of the tumor microenvironment. However, multiple such pathways would likely need to be targeted simultaneously to meaningfully attenuate tumor aggressiveness. Perhaps more importantly, these factors all point to the abundance of metabolic alterations within the tumor microenvironment that may serve not only as therapeutic targets, but as biomarkers of disease burden, tumor phenotype, microenvironmental conditions, and response to therapeutic interventions. In addition to metabolites, cytokines, microRNAs, peptides and other biomarkers can all be captured from the extracellular tumor microenvironment to better understand local human disease processes, and mechanisms of sensitivity or resistance to therapies. Since avoiding neurotoxicity is an important consideration in treating CNS tumors extracellular biomarkers or biomarker signatures obtained from focally treated brain regions adjacent to tumor may also yield insights regarding potential toxicities of candidate therapies.

Figure 1:
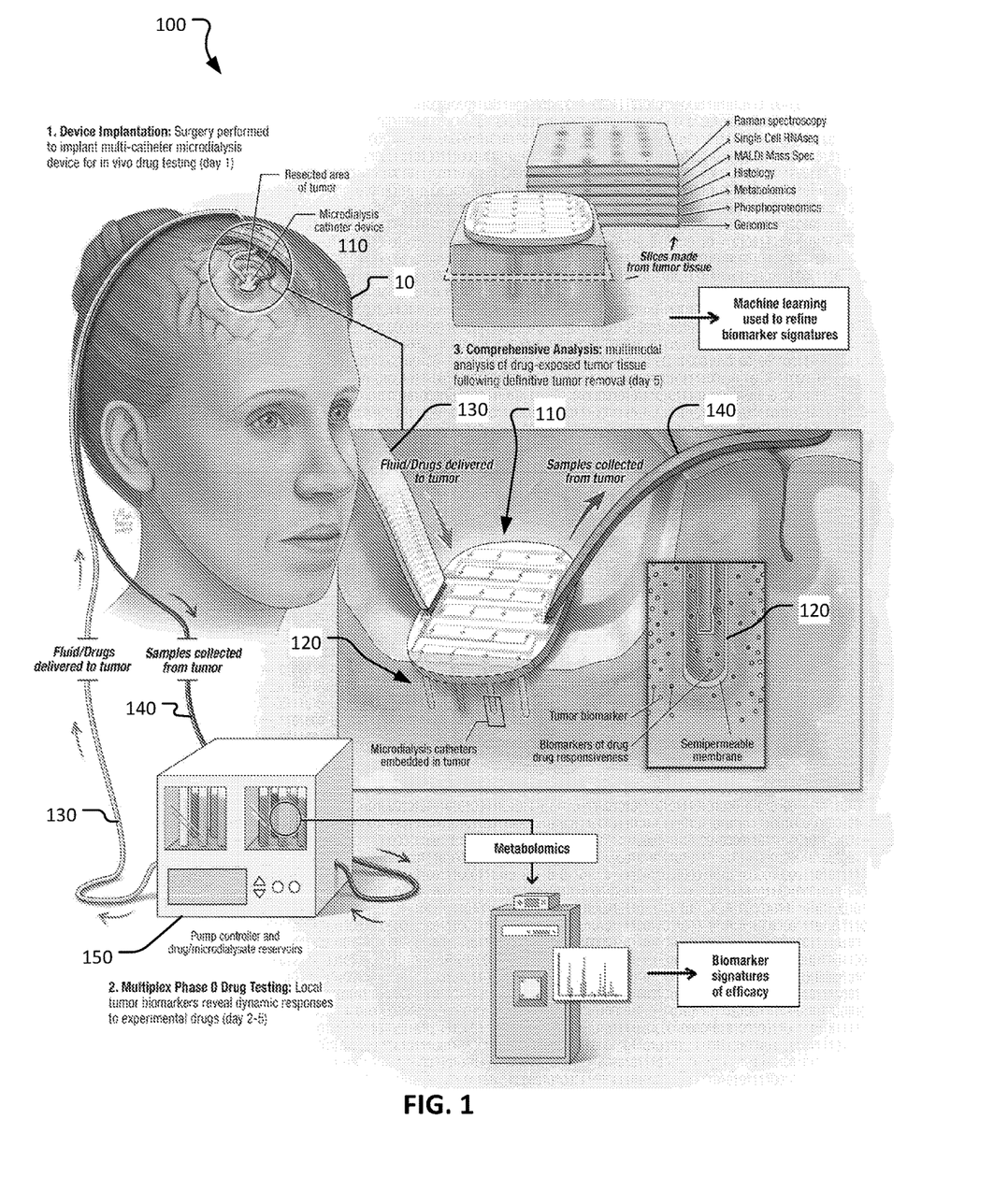
FIG. 1 is a schematic diagram of a patient with an example implanted metabolomic system wherein brain tumors may undergo in vivo drug testing of candidate therapeutics to evaluate efficacy via metabolomic signatures.

Referring to FIG. 1, described herein are systems 100 and methods for in vivo drug testing in the brain that can be used clinically in the neurosurgical environment to expedite therapeutic discovery and translation. In some embodiments, the system 100 described herein includes an implantable device 110 comprising multiple microdialysis catheters 120.

The system 100 may be utilized to concurrently perform multiple FDA phase 0 drug tests in vivo via reverse microdialysis. Local tissue extracellular biomarkers collected in harvested microdialysate may be utilized to obtain a mechanistic understanding of drug efficacy and toxicity. The flexibility of this system 100 positions it to address long-standing challenges in translation of CNS therapies such as: direct CNS delivery, granular mechanistic outcome measures, ability to perform patient-specific testing and to screen multi-drug therapies. Clinically deployed, this system 100 has the potential to transform the discovery-translation-application process for CNS therapies.

The multiple microdialysis catheters 120 are fixed in a defined geometric array, each appropriately connected to inlet tubing 130 and outlet tubing 140 or fluid channels to carry microdialysate fluid to and from each catheter. This device 110 can be used in vivo in human patients to enable delivery of therapeutic candidates to diseased brain tissue at each catheter site via reverse microdialysis, and timely biomarker feedback regarding the impact of each candidate in each location over time. Biomarkers collected from each sampled location can be utilized to characterize glioma metabolism, physiology, and response to therapeutic candidates in situ, within the human CNS microenvironment.

The system 100 uses microdialysis to sample the extracellular space of the live tissues. The components of a microdialysis catheter 120 include a semipermeable membrane, with a pre-defined molecular size cut-off, which, permits diffusion of solutes smaller than the cut-off size into and out of the catheter down their respective concentration gradients. Microdialysis fluid is perfused through the catheter 120 via inlet 130 and outlet tubes 140 typically at a rate ranging from about 0.3 µL/min to about 1.0 µL/min. After a microdialysis catheter 120 is placed in brain tissue and perfused, and then allowed to equilibrate, the outlet fluid contains a representative sampling of the brain extracellular fluid composition, including the metabolites and biomarkers free to diffuse through the semipermeable membrane of the microdialysis catheter 120.

The system 100 uses also uses reverse microdialysis, which is identical to microdialysis with the exception that a drug or other agent of interest is included in the microdialysis fluid for diffusion into the brain around the catheter. The exact amount of drug delivered to the brain can be inferred from the concentration remaining in the recovered microdialysate. Moreover the impact of that agent on the brain can be evaluated over time through changes in the microdialysate composition.

Still referring to FIG. 1, in "Step 1," the device 110 will be implanted (at the time of an open partial resection of a brain tumor in some cases). This first surgery will serve at least two purposes—first to obtain diagnostic tissue that can be analyzed using standard neuropathology protocols; and the second for implantation of the multi-catheter device 110. The properties of each catheter 120 deployed within the device 110 may be optimized to the collection of one or more classes of compounds, based upon the material employed for the semipermeable membrane and its molecular cutoff. In some embodiments, multiple different types of catheters 120 may be utilized within the same device 110 to enhance the total range of molecules captured.

The device 110 can be positioned within the cavity left by the open biopsy, with catheters 120 embedded into the tumor. The catheters 120 are tunneled under the skin and compatible with intratumoral microdialysis within hospitalized patients for up to several days.

During "Step 2," multiplex reverse microdialysis will be performed in order to obtain biomarker signatures of disease and therapeutic response to perfused therapeutic candidates. This use of the system 100 is based upon phase 0 drug trial principles. Whereas, phase 0 drug trials typically involve systemic delivery of microdoses of drug to evaluate target binding and/or or pharmacokinetics and pharmacodynamics, microdoses can also be delivered focally within tissues of interest. As proposed herein, each patient's tumor will be used to yield near-real-time biological feedback regarding the impact of one or more drugs therapeutic candidates. Availability of these unprecedented insights may empower clinicians to optimize each patient's own treatment, and is expected to vastly accelerate the rate of discovery. Since every patient's tumor is both heterogeneous and unique, microdialysate from all drug test sites would be analyzed and ultimately paired with the corresponding histologic, genomic, transcriptomic, metabolomic, and proteomic data obtained from corresponding regions of treated tumor tissue, once the tumor is removed.

A second surgery will thereafter be performed for maximal safe resection of the remaining tumor. At that time, the device 110 will be removed en-block such that the tissue exposed to each unique catheter 120 is removed with the catheter itself for subsequent histological and molecular analysis (as described in "Step 3" of FIG. 1). The data obtained from this analysis, such as histologic evidence of tumor cell death, will be used to iteratively refine the interpretation of biomarkers previously collected via microdialysis.

In some embodiments, the device 110 includes all non-metallic components and catheters to thereby permit MRI-compatibility. Depending on the application, each catheter 120 will typically extend about 4 millimeters from the block or chip, with the distal 2 millimeters comprising semipermeable membrane across which microdialysis occurs. The proximal inactive 2 mm of the catheter 120 helps to ensure that microdialysis occurs only within the tumor even if the chip is not completely flush against the resection cavity surface. A 3 mm spacing between each catheter 120 helps minimize the concentration of drugs originating from adjacent catheters 120, with estimated concentration fall-off of 10-1000× at 3 mm, depending on the physical properties of the drug.

An alternate design of the device 110 employs a microfluidics chip, which serves as a manifold for routing fluid to and from each microdialysis catheter 120. In this design the inlet and outlet catheters 120 are conveniently positioned on opposite side of the chip, respectively. Using this design, the inlet and outlet channels of the microdialysis catheter are separately bonded to their respective layers of the microfluidics chip, enabling inlet and outlet channels to be routed separately through their respective layers of the 2-layer PDMS microfluidics chip. This design may facilitate bundling of catheters 120 for routing to connectors and pumps, and may reduce steric constraints when positioning the device within a tumor biopsy cavity.

Figure 2:
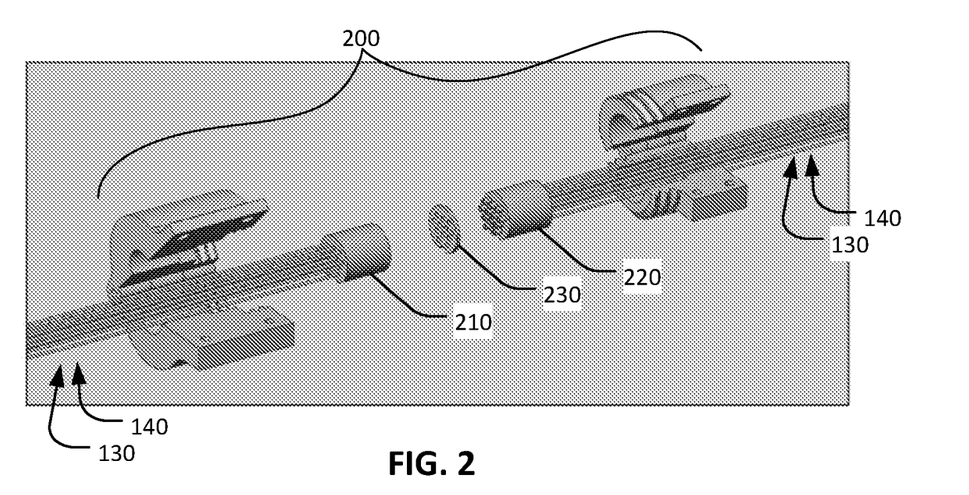
FIG. 2 shows a perspective exploded view of an example tubing connector that can be used with the system of FIG. 1.
Figure 3:
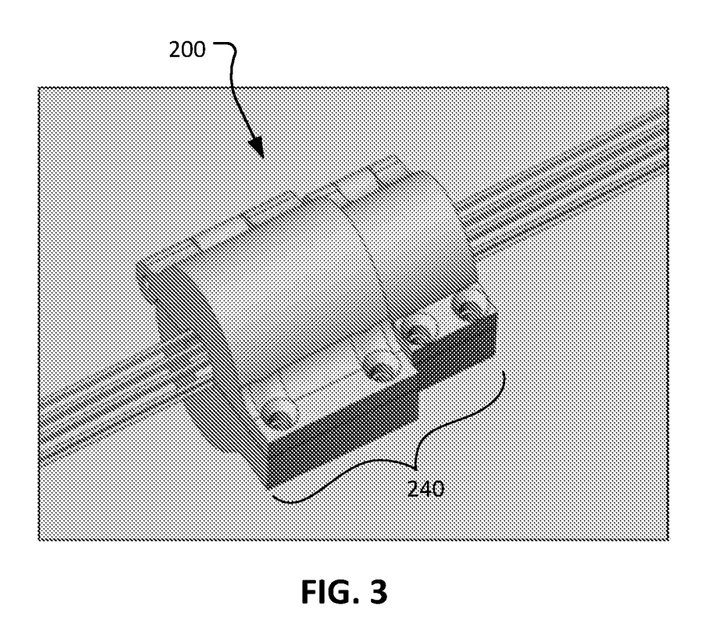
FIG. 3 shows a perspective assembled view of the tubing connector of FIG. 2.

The system 100 can advantageously be used for at least the following purposes and/or outcomes:
- Interrogate mechanisms of human CNS disease ("lab in brain")
- In vivo drug screening, including Phase 0 drug trials
- Identify biomarkers of response
- Identify biomarkers of CNS toxicity
- Screen for optimal drug combinations
- Perform local in vivo dose response assays
- In vivo PK/PD
- Identify patient-specific tumor features
- Identify signatures of resistant tumor stem cells after therapy
- Analyze multiple mechanistic pathways concurrently
- N=1 therapies for complex diseases and heterogeneous tumors
- Compile data across patients to accelerate translation Referring also to FIGS. 2 and 3, lengths of inlet tubing 130 and outlet tubing 140 are connected to the device 110. This tubing is placed into two bundles, one for inlet and one for outlet, to give better control over the routing path. In some embodiments, this tubing is constructed of FEP, a material proven to provide both biocompatibility and proper microdialysis fluid flow. Up to 12 inlet or outlet tubing lines can be bundled together and connected to extension tubing using a custom-designed tubing connector 200.

The importance of this connector 200 is to enable the patient 10 to be disconnected from the pump/reservoir apparatus 150 for MRI (for MRI-compatible designs) or CT (as pictured). The jack half 210 of the tubing connector 200 is bonded to the short lengths of inlet or outlet tubing that are permanently connected to the device 110, while the plug half 220 of the connector 200 is bonded to the inlet tubing 130 or outlet extension tubing 140. A silicone gasket 230 is employed between the two halves 210/220 to ensure the connection is watertight. A hinged clamp 240 screws together over the connector to provide constant tension behind each half of the connector 200 preventing inadvertent disconnection. If desired, the number of threads on the clamp 240 can be calibrated so that the connector 200 releases under a specific amount of force.

Still referring to FIG. 1, standard microdialysis tubing connects the pump 150 to the short inlet tubing 130 and the short outlet tubing 140 to the collection vials. FEP tubing is used provide both biocompatibility and proper microdialysis fluid flow.

Standard commercial collection vials (sterile microcentrifuge tubes or similar) are used for collection of microdialysate, and maintained at or below 4 degrees centigrade, via a refrigerate block or an automated fraction collector. Aliquots are frozen at regular intervals prior to downstream analysis. If desired, a robotic system can be deployed to facilitate near-real-time metabolomic analysis.

The pump system 150 is comprised of a commercial syringe pump or multiple syringe pumps with sufficient channels for the number of catheters 120 in use. The commercial pump has a built-in menu system with a keypad interface to allow the user to set the flow rate and syringe size. The identity of each individual line (inflow and outflow) is tracked according to the physical location of the corresponding catheter 120 so that analyses performed on drug-exposed tissue can be correlated to biomarker signatures obtained by the catheter 120 in that location.

Mutations in metabolic enzymes may promote tumorigenesis, as illustrated via IDH-mutant tumors. Using system 100 and the technique of microdialysis, biofeedback of metabolites will provide insights into tumor microenvironment, which may uncover novel therapeutic targets. Prior treatments may also impact tumor behavior. Prior published work has demonstrated that upon placement of 2 microdialysis in each of 15 patients with glioblastoma, one within the tumor and one just outside the tumor, over 50% of the metabolites identified demonstrated significantly differing concentrations between the 2 regions. Moreover, metabolomic changes and cytokine levels measured upon treatment with brain radiation varied substantially between the 2 regions, with increased inflammatory signaling upon radiation in the tumor versus the brain adjacent to tumor. Similarly, a pilot investigation of microdialysis and metabolomic analysis in the burns lab illustrates the potential of microdialysis in combination with metabolomics.

To investigate the potential alterations in the tumor microenvironment that may impact tumor progression, whole brain or sham radiation was performed prior to implantation of human glioma cells. Microdialysis was performed at 1 month following radiation, by which time no tumor was detectable on MRI, due to the modest tumor growth rate. In this setting, among 840 detected metabolites, 107 of these demonstrated significantly different concentrations between groups. For example, 10-fold or greater differences were measured in D-sorbitol, N-Methyladenosine, Quebrachitol, and 4-Chlorobiphenyl, which each have implications for the neural injury associated with radiation therapy.

Because the microdialysis catheters 120 are very small and the drugs are delivered in microdoses, the treatment using the system 100 only occurs in a focal region of brain surrounding the microdialysis catheter 120. The exact volume exposed to the drug will vary based on the pharmacokinetic properties of the drug in the CNS, as impacted by molecular size and properties, including solubility and susceptibility to efflux transporters. Concentration will decline exponentially at greater distances from the catheter 120, with typically at least 2-3 log decline in concentration within millimeters of the catheter 120. In this manner the systemic concentrations of the drug will be negligible, averting associated potential side effects of systemic exposure. The system 100 will thereby enable safe and efficient screening of putative therapies—be they individual drugs or therapeutic cocktails—each focally delivered via reverse microdialysis into a discrete region of brain. Using the multi-catheter features of the device 110, net quantity of drug delivered into the brain will be determined by quantification of the decreased concentration of drug in the return microdialysate from the catheter 120; the diffusion distance will be assessed by detection of drugs from adjacent catheters 120, that may themselves be delivering vehicle, or a different drug. In this manner, multiple concurrent FDA phase 0 drug trials, drug concentration dose response studies, and multi-drug combination assays, could potentially all be performed concurrently within discrete region of tumor.

The system 100 can be used in the context of glioma—an incurable disease for which standard of care already requires neurosurgical intervention to obtain diagnostic tissue and remove as much tumor as is safely possible. The technology platform of system 100 may also extend far beyond neuro-oncology. Other diseases for which CNS tissue is routinely accessed via neurosurgical procedures include epilepsy, traumatic brain injury, stroke and Parkinson's disease. The value of insights and translational progress enabled via system 100 may give rise to patients even with neurological diseases not typically considered as "neurosurgical," such as Alzheimer's disease, Huntington's disease, and ALS, to benefit from in vivo drug testing of therapeutic candidates via the system 100. Given the essentially uniform failure of clinical trials to date of candidate drugs developed using existing paradigms, a technology as proposed permitting real time in vivo access to extracellular biomarkers of diseases and response to therapy, could greatly accelerate translational progress across neurological diseases. Moreover, to the extent that ex vivo tissue engineering, tissue culture, or engineered animal model systems seek to optimally replicate the human state of health or diseases, the system 100 may be deployed to critically evaluate to what extent such systems achieve such goals by evaluating the biomarker signatures of such systems in comparison to the gold standard human in vivo condition. To the extent that such systems can serve as adequate surrogates of in vivo human tissue, pre-clinical drug screening can also be performed using the device 110 in these systems.

Mathematical modeling increasingly demonstrates that the dose, timing, and order of therapies may be critical variables to therapeutic success. For examples, tumor subclones may exist in competition with each other, such that elimination of a dominant clone may leave a previously minor, but therapeutically resistant clone free to expand unfettered. As such, cycles of drug treatment and use of "maximally effective" rather than "maximally tolerated" drugs may be important to optimize the biology of a complex tumor ecosystem. Local tissue biomarkers obtainable from the system 100 may prove critical to both better understanding such interactions. Empirically testing these variables in individual patients' tumors may inform therapeutic strategies optimized for each individual's disease.

The system 100 employs microdialysis catheters 120 with a semipermeable membrane. As such, compounds larger than the designated cut-off size will not be delivered or collected. For example, an antibody conjugate of 150 kDa would require an appropriately selected cut-off. Collection of extracellular vesicles and their associated biomarker payload may be possible with pore size cut-off of 3000 kDa or greater, though the feasibility of capturing large vesicles may require additional innovations in catheter materials and design.

Biofouling of the catheters 120 is a phenomenon that may progressively hamper drug delivery and biomarker collection over time. Appropriate coatings on the catheters 120 can be employed to mitigate this. Moreover, performance over time will be quantified through internal control strategies (e.g., catheter-to-catheter delivery of known standards), and corrected for in interpretation of data collected.

The combination of reverse microdialysis with collection of local extracellular biomarkers, as described herein, subjects adjacent tissue to a range of therapeutic concentrations due to exponential decline in concentration away from the catheter 120. As such, precise determinations of optimal drug concentrations can require additional validation with alternate strategies, such as systemic delivery and/or convection enhanced delivery.

The device 110 is intended for temporary implantation. A brain tumor may evolve and mutate over time in response to therapies. As such, the system 100 may be valuable to define progressive alterations of the tumor, either through multiple deployments of the device at successive surgeries, or through development of a more chronically implanted version of this technology. In some embodiments, the device 110 may be paired with electrodes for real-time insights regarding pharmacologic and electrical neuromodulation.

Figure 4:
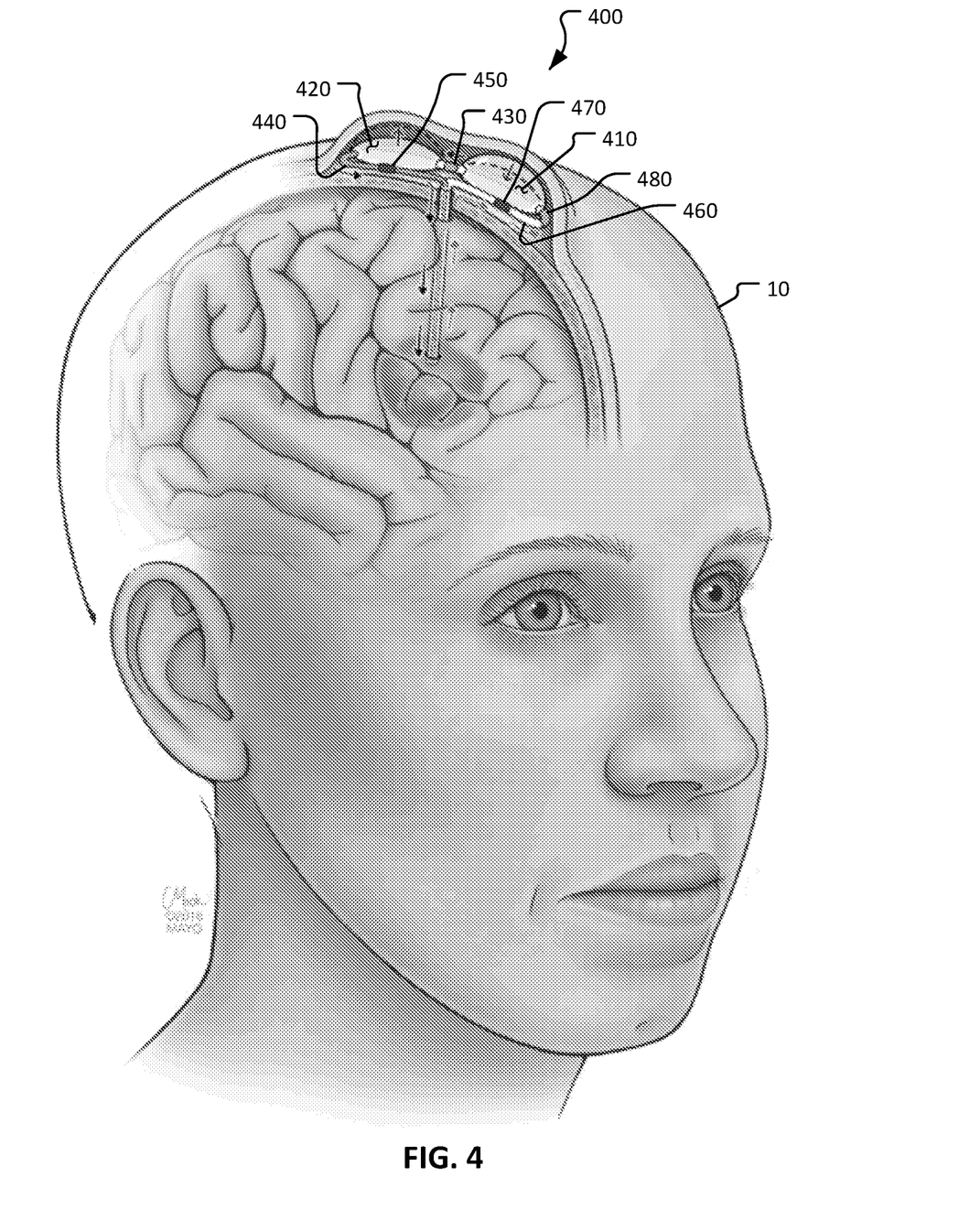
FIG. 4 shows a patient with an example implanted device for delivering a drug into a brain parenchyma of the patient and accessing biomarkers from the brain parenchyma.

Referring to FIG. 4, an implantable drug delivery and biomarker access device 400 (or simply "device 400") can be used to treat a patient 10. The device 400 may be temporarily or permanently implanted and used for longitudinal intermittent access to tumor biomarkers, as well as for use in phase 0 drug testing applications.

Device 400 includes two reservoirs (one self-filling reservoir 410 and one self-emptying reservoir 420) that are implanted between the scalp tissue and the skull of the patient 10. In some embodiments, the volume of the self-filling reservoir 410 and the self-emptying reservoir 420, when expanded, ranges from about 0.5 cc to about 1.5 cc, or about 0.8 cc to about 1.2 cc, or about 0.8 cc to about 2.0 cc, or about 0.1 cc to about 0.6 cc, or about 0.01 cc to about 0.2 cc, without limitation.

The self-filling reservoir 410 is naturally biased (with a known amount of force) to be in an expanded configuration. The self-emptying reservoir 420 is naturally biased (with a known amount of force) to be in an unexpanded configuration. The self-filling reservoir 410 is connected to the self-emptying reservoir 420 by a first one-way valve 430. The first one-way valve 430 allows flow of fluid from the self-filling reservoir 410 to the self-emptying reservoir 420, but prevents flow in the reverse direction.

A perfusion catheter 440 extends from the self-emptying reservoir 420 through a hole or opening in the skull of the patient 10. The perfusion catheter 440 conveys fluid emptying from the self-emptying reservoir 420 and delivers the fluid to the brain parenchyma, tumor, and/or other types of tissue. A first flow control valve 450 is positioned along the perfusion catheter 440 and serves to throttle or modulate the fluid flowrate. In some cases, the fluid is perfused at a rate in a range of about 0.3 μL/min to about 0.5 μL/min or about 1.0 μL/min for 36-48 h.

A biomarker access catheter 460 (or "return catheter") leads to the self-filling reservoir 410. A second flow control valve 470 is positioned along the biomarker access catheter 460 and serves to throttle or modulate the biomarker-rich fluid flowrate as it flows into the self-filling reservoir 410.

A second one-way valve 480 is located along the biomarker access catheter 460. The second one-way valve 480 allows flow of fluid into the self-filling reservoir 410, but prevents flow in the reverse direction.

In some embodiments, such as the depicted embodiment, some portions of the perfusion catheter 440 and the biomarker access catheter 460 are joined as a single dual lumen catheter. In some such embodiments, the perfusion catheter 440 may be positioned within the biomarker access catheter 460 (e.g., coaxially). In some embodiments, the catheters 440/460 will have a tapered tip with multiple protected side ports near the distal tip, open to the CNS for perfusion and exchange of solutes and biomarkers. In some embodiments, one or more portions of the perfusion catheter 440 and/or the biomarker access catheter 460 have fenestrations or mesh portions. Radiopaque markers may be included on one or more portions of the perfusion catheter 440 and/or the biomarker access catheter 460.

In use, a liquid substance (e.g., one or more pharmacological agents) can be percutaneously injected (e.g., via a syringe) into the self-filling reservoir 410. Then, while the liquid substance is residing in the self-filling reservoir 410, manual pressure can be applied to the scalp of the patient 10 to cause the liquid substance to flow out from the self-filling reservoir 410 and into the self-emptying reservoir 420 (while the second one-way valve 480 prevents the liquid substance from flowing into the biomarker access catheter 460). In some embodiments, one or more catheters 440/460 may be placed within different locations of a tumor parenchyma or the brain adjacent to a tumor.

The normally unexpanded self-emptying reservoir 420 will receive the liquid substance from the self-filling reservoir 410 and become expanded as a result. In some cases, the self-emptying reservoir 420 can additionally or alternatively be filled by a percutaneous needle injection. Since the self-emptying reservoir 420 is naturally biased to be in an unexpanded configuration, the liquid substance will be forced to gradually flow from the self-emptying reservoir 420 into the perfusion catheter 440. The first flow control valve 450 will throttle or modulate the flowrate of the liquid substance. The liquid substance will exit from the perfusion catheter 440 into the surrounding tissue (e.g., tumor).

After the liquid substance is manually forced out of the normally expanded self-filling reservoir 410, the self-filling reservoir 410 will naturally tend to expand, and to draw fluid through the biomarker access catheter 460 to refill itself The fluid drawn into the self-filling reservoir 410 via the biomarker access catheter 460 will be biomarker-rich fluid that can be accessed percutaneously (e.g., using a syringe through the scalp to aspirate the fluid from the self-filling reservoir 410).

The implantable drug delivery and biomarker access device 400 provides longitudinal access to the brain parenchyma microenvironment (over months or years) for access to extracellular CNS biomarkers of neurological disease. The implantable drug delivery and biomarker access device 400 also provides minimally invasive access to the brain parenchyma for in vivo drug screening purposes.

In some cases, the implantable drug delivery and biomarker access device 400 can be used for serial evaluation of response to a locally delivered drug (e.g., a phase 0 drug test). Fluid may first be withdrawn from the self-filling reservoir 410 by a butterfly needle (to prime the "pull" pump), then a candidate drug-containing solution may be injected into the self-emptying reservoir 420 (to prime the "push" pump). Local brain biomarkers from the tip of the biomarker access catheter 460 can then be collected from the self-filling reservoir 410 in 1 to 2 days. Time-course analysis of drug response can be followed longitudinally over time with continued outpatient percutaneous injections/withdrawals every 1 to 2 days. If no drug testing is desired (e.g., intermittent follow-up biomarker analysis for glioma monitoring), or evaluating response to systemically-delivered drug, the system can be simply primed by pushing on the self-filling reservoir 410 to fill the self-emptying reservoir 420. The dual lumen catheter 440/460 will be perfused for the next 1 to 2 days after which biomarkers will be ready for collection from the self-filling reservoir 410.

In some embodiments, a higher-volume "irrigation" mode could be used to enable access of actual tumor or immune cells by gentle "washing" of the brain parenchyma.

In some cases, since the self-emptying reservoir 420 is designed to normally have a near-zero volume when not primed, biomarker-containing fluid can be transmitted from the self-filling reservoir 410 to the self-emptying reservoir 420 for immediate collection without dilution, enabling sampling and re-priming to occur from a single percutaneous needle injection.

Multi-catheter systems are envisioned for multi-drug testing, and evaluation of CNS pharmacokinetics/pharmacodynamics, including delivery of drug via a single catheter, and detection of drug via a separate catheter to evaluate diffusion, delivery, efflux, and the like.

In some embodiments, more complex multi-catheter systems could be paired with a specialized multi-needle device to facilitate convenient, accurate targeting for sampling/refilling.

In some embodiments, the implantable drug delivery and biomarker access device 400 may be adapted to provide an optimal percutaneous system for positive or negative convection-enhanced delivery.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described herein should not be understood as requiring such separation in all embodiments, and it should be understood that the described program components and systems can generally be integrated together in a single product or packaged into multiple products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method of delivering a drug into a brain of a patient and accessing biomarkers from the brain, the method comprising:
    implanting a drug delivery device into the patient, wherein the drug delivery device comprises;
      a first reservoir;
      a second reservoir;
      a perfusion catheter extending from the second reservoir and in fluid communication with the second reservoir; and
      a return catheter extending from the first reservoir and in fluid communication with the first reservoir,
      wherein the first and second reservoirs are independently biased and fluidly segregated, such that fluid moves in a single directional flow path without recirculation between the first reservoir and the second reservoir;
      wherein the implanting comprises positioning the first reservoir and the second reservoir between a scalp and a skull of the patient and extending the perfusion catheter and the return catheter into the brain;
    compressing the first reservoir such that a fluid in the first reservoir is caused to flow into the second reservoir, wherein the fluid that is caused to flow into the second reservoir by compressing the first reservoir causes expansion of the second reservoir;
    after the expansion of the second reservoir, allowing the fluid to flow out of the second reservoir and into the perfusion catheter as a result of a natural bias of the second reservoir to be in an unexpanded configuration, wherein at least some of the fluid that flows into the perfusion catheter exits from the perfusion catheter into the brain; and
    after the compressing the first reservoir, allowing the first reservoir to re-expand as a result of a natural bias of the first reservoir to be in an expanded configuration, wherein at least some of the fluid from the brain is drawn into the return catheter and flows from the return catheter into the first reservoir as a result of the re-expansion of the first reservoir.

2. The method of claim 1, further comprising, after the at least some of the fluid from the brain has flowed into the first reservoir, aspirating the at least some of the fluid from the first reservoir.

3. The method of claim 2, wherein the aspirating is performed using a syringe through the scalp.

4. The method of claim 1, wherein the drug delivery device further comprises:
   a first one-way valve disposed along a fluid connection between the first reservoir and the second reservoir; and
   a second one-way valve disposed along the return catheter.

5. The method of claim 4, further comprising allowing the fluid to flow, via the first one-way valve, from the first reservoir to the second reservoir and preventing the fluid from flowing, via the first one-way valve, from the second reservoir to the first reservoir.

6. The method of claim 4, further comprising allowing the fluid to flow, via the second one-way valve, from the return catheter to the first reservoir and preventing the fluid from flowing, via the second one-way valve, from the first reservoir to the return catheter.

7. The method of claim 1, wherein the drug delivery device further comprises a first flow control valve located along the perfusion catheter, and
   wherein the first flow control valve throttles or modulates a flowrate of the at least some of the fluid that exits from the perfusion catheter into the brain.

8. The method of claim 1, wherein at least some portions of the perfusion catheter and the return catheter are joined as a single dual lumen catheter.

9. The method of claim 1, further comprising percutaneously injecting the fluid directly into the first reservoir using a syringe through the scalp.

\* \* \* \* \*